Oct. 20, 1931.  E. N. FOX  1,828,178

PISTON ROD PACKING AND SCRAPING DEVICE

Filed Sept. 1, 1928

INVENTOR:
Edgar N. Fox,
By Attorneys,
Fraser, Myers & Manley.

Patented Oct. 20, 1931

1,828,178

UNITED STATES PATENT OFFICE

EDGAR N. FOX, OF PALMYRA, NEW YORK, ASSIGNOR TO THE GARLOCK PACKING COMPANY, OF PALMYRA, NEW YORK, A CORPORATION OF NEW YORK

PISTON ROD PACKING AND SCRAPING DEVICE

Application filed September 1, 1928. Serial No. 303,571.

This invention relates to a piston rod packing and scraping device which in certain respects is an improvement in modified form on the device disclosed in a prior application, Serial No. 218,438, filed September 9, 1927, by Fox & Hampshire now Patent No. 1,822,521, issued September 8, 1931. The device comprises a segmental metal ring and resilient means whereby the elements of said ring may be held against the surface of a piston rod under sufficient pressure to break down and remove a film of lubricating oil or similarly viscous liquid. Two or more such rings may be mounted in a suitable housing provided with appropriate means whereby liquid removed from the piston may be drained away. The segments are of such form as to provide a continuous and unbroken surface adapted to cooperate with one surface of the casing or housing in which the rings are mounted and afford a seal against the flow of fluid in at least one direction. If the device is intended to be used in power units requiring a fluid-tight seal about the piston rod in both directions, or a seal against a difference of pressure greater than that which can be maintained by the combined packing and scraping rings, said rings may be used in combination with additional packing rings in a manner indicated in the aforesaid prior application of Fox & Hampshire.

It is an object of the invention to provide a satisfactory packing and scraping ring of the above-described character, one or more of which may be mounted in a casing and provided with means whereby liquid removed from the cylinder may be drained from the scraping rings to the casing and from the casing to the enclosing part of the power unit, means also being provided whereby both the rings and the casing may be vented to facilitate the flow of the liquid.

It is a further object of the invention to provide a scraping and packing ring such as has been described, adapted to be mounted in an ordinary stuffing box which need be but slightly modified to receive the same.

In the accompanying drawings illustrating the preferred and modified forms of the invention,—

Figure 1:
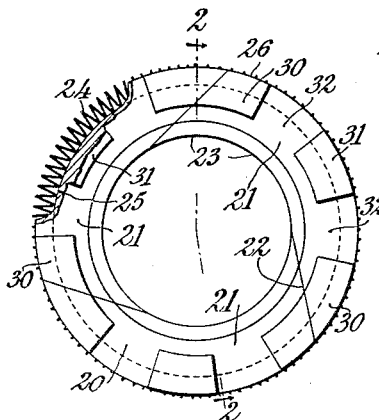
Figure 1 is a face view of a combined packing and scraping ring, a portion thereof being omitted to disclose underlying structure.
Figure 2:
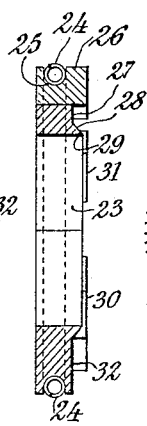
Fig. 2 is a cross-sectional view of the ring illustrated in Fig. 1, the section being taken along the plane represented by the line 2—2 of Fig. 1.

Referring first to Figs. 1 and 2 of the drawings, a preferred form of packing and scraping ring 20, embodying the invention is illustrated as comprising three segments 21 having mutually contacting complemental end surfaces 22 disposed in planes approximately tangent to the inner circumferential surface 23 of the ring. The ring may be divided into any number of segments, but the most satisfactory results have been obtained by the use of three segments, as illustrated.

The inner circumferential surfaces 23 of the segments should correspond in diameter with that of the piston on which the rings are to be used, and appropriate means should be provided to maintain the surfaces 23 in contact with the piston under a pressure sufficient to break down and remove a film of lubricating oil or similarly viscous liquid. This may be accomplished by the use of a spring of suitable character herein illustrated as comprising a relatively strong garter spring 24, which may be held in position about the ring in a slot 25 provided therefor in the outer circumferential surface 26.

The tangential contacting surface between the ring segments is such as to permit the segments to be moved slightly toward the center as their inner surfaces wear away without producing any gaps or interruptions between the ends of the segments such as would provide an opening for the escape of fluid and such as would break the continuity of the scraping surface 23.

If desired, the face 27 of the ring at which lubrication is intended to be removed from the piston may be flared outwardly as at 28, thereby forming a scraping edge 29 of something less than 90°.

When two or more of the rings 20 are intended to be used in tandem, it is important that they be slightly separated from each other in order that liquid removed from the piston by a scraping edge of one ring adjacent the surface of another ring may be drained away. In the form of the invention illustrated in Figs. 1 and 2 this has been accomplished by providing the ring 20 with spacing lugs 30, 31, which should preferably extend from the face 27 having the flared surface 28 meeting the circumferential surface 23 to form its scraping edge.

The spacing lugs 30 may be of sufficient length to provide for the tangential cuts forming the contacting surfaces 22. The lugs 31 may be of shorter length, as indicated in Fig. 1.

The channels or ports 32 separating the ends of the lugs 30, 31 afford satisfactory means for venting and draining the spaces between two adjacent rings or between a ring and an adjoining wall of the casing, one or more of the ports at the lower part of the ring serving as the draining means, and one or more of the ports at a higher level serving as the venting means.

Figure 3:
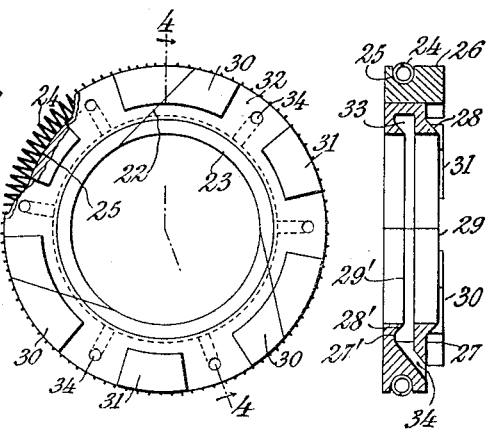
Fig. 3 is a face view of a modified form of packing and scraping ring.
Figure 4:
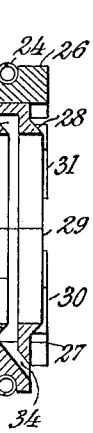
Fig. 4 is a cross-sectional view of the ring illustrated in Fig. 3, the section being taken along the plane represented by the line 4—4 of Fig. 3.

In the modified form of the invention illustrated in Figs. 3 and 4 an annular slot 33 is cut in the inner surface 23 of the ring, thereby providing a surface 27′ corresponding with the exterior surface 27 and adapted to form a second scraping edge 29′ at its junction with the surface 23. If desired, the surface 27′ may be flared as at 28′ to correspond with the flaring 28 of the surface 27.

In order that liquid removed from the piston by the auxiliary scraping edge 29′ may be drained away, the groove 33 may be provided with ports 34 leading to one of the outer surfaces of the ring. Preferably such grooves will be so disposed as to open into the surface 27 of the ring between the abutments 30, 31. The ports 34 should be spaced about the ring so that one or more of them will always be located near its bottom portion to serve as drainage means while others will be located at higher levels to serve as a venting means.

Figure 5:
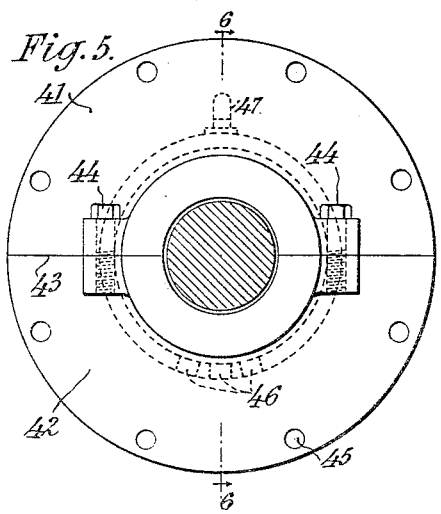
Fig. 5 is an end view of a casing in which rings like those illustrated in Fig. 1 may be mounted in combination with packing rings to afford an additional fluid-tight seal.
Figure 6:
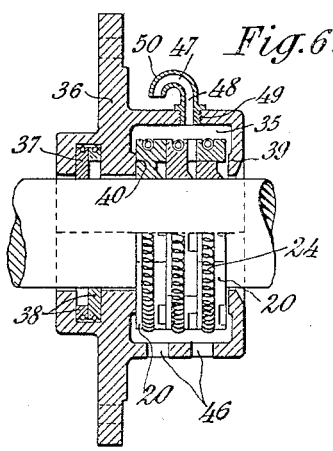
Fig. 6 is a cross-sectional view through the casing illustrated in Fig. 5 and enclosed rings, the section being taken along the plane represented by the line 6—6 of Fig. 5.

Two or more of the rings of the form illustrated either in Fig. 1 or in Fig. 3 may be assembled in tandem relation, with their joints 22 out of alignment, and mounted about the piston in a suitable housing or casing provided for such purpose. As illustrated in Figs. 5 and 6, three of the rings of the form shown in Fig. 1 are represented as being enclosed in a chamber 35 of a casing 36 having a second chamber 37 within which may be mounted sectional packing rings 38, an appropriate form of which is fully disclosed in the above-mentioned application of Fox & Hampshire.

The distance between the walls 39, 40 of the chamber for the scraper rings should exceed the combined width of the three rings to an extent no more than may be sufficient to provide a satisfactory working clearance such as will permit the scraper rings to float with respect to the walls of the casing to an extent corresponding with the slight lateral movements of the piston.

The casing 36 may be made in two sections 41, 42, having plane contacting surfaces 43 whereby the casing may be closed about the packing and scraping rings and piston and secured by appropriate fastening means 44. The casing 36 may be secured to the partition plate or wall plate of the power unit by fastening means passed through openings 45 provided therefor in a position such as to maintain the openings in the enclosing walls of the chambers for the packing and scraping rings concentric with the piston.

Although the rings 20 are especially adapted for use as scraping rings, it has been found as a result of actual experience that they are capable of affording a satisfactory seal against the flow of fluid in one direction provided the pressure is not too great. For example, as applied in Fig. 6, if the pressure at the right side of the partition wall were to exceed the pressure at the left side, the left-hand scraping ring 20 would be moved into close contact with the wall 40 of the casing and prevent a flow of fluid from right to left through the joint about the piston. This seal would be effective even in the absence of the packing rings 38, which need be used only if the pressure to be overcome is greater than that which can be taken care of by the scraping rings or when it is desired to seal the joint against the flow of fluid in both directions.

This sealing effect of the scraper rings is dependent in part upon the tangentially-disposed contacting surfaces between the ends of the ring segments which permit the segments to move inwardly about the piston as they are worn away without becoming separated from each other. Segmental rings of forms having gaps between the ends of their segments have been found unsatisfactory as packing rings when separated from each other in order to drain liquid away from their scraping surfaces.

In order that liquid removed from the piston by the scraping rings may be drained from the casing 36, the lower wall of the casing should be provided with one or more drainage ports 46, as indicated in Fig. 6, and the flow of liquid from the casing may be materially expedited by providing the casing, at some point above the level of the drainage ports 46, with a vent 47. Such vent should preferably have its end turned downwardly and away from the direction from which oil or other liquid might be splashed, so that the liquid will not enter the chamber 35 through the vent. A satisfactory form of vent as illustrated in Fig. 6 comprises a tube 48 having a threaded connection 49 with the casing and terminating in a gooseneck 50 with its exterior end directed downwardly.

Packing and scraping rings like those illustrated in either Fig. 1 or Fig. 3 may be mounted in an ordinary stuffing box which need be but slightly modified to receive the same.

Figure 7:
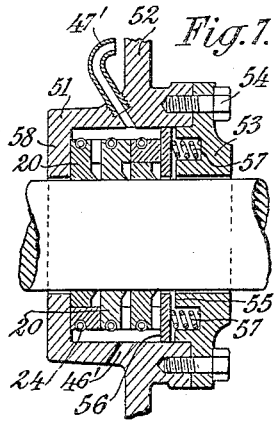
Fig. 7 is a sectional view through a scraping device comprising scraping rings like those illustrated in Fig. 1, mounted in a reconstructed stuffing box and adapted to effect a fluid-tight seal against pressure in one direction.

As indicated in Fig. 7, a stuffing box 51 having a flange 52, by which it may be secured to a partition or wall plate in the usual manner, is provided with a gland 53 which may be secured directly against the end of the stuffing box by fastening devices 54. The gland may be trimmed off to a surface 55 such as will provide space of a length in the stuffing box somewhat exceeding that which may be needed to receive the packing and scraping rings 20. Between the rings 20 and the gland may be inserted a follower ring 56, which may be held in contact with the adjacent scraper ring by means of springs 57 held in position in recesses provided therefor in the face of the gland 53.

The use of the follower ring and springs illustrated in Fig. 7 avoids the necessity of providing a space of accurate length for the scraping and packing rings such as may readily be provided when the entire structure is produced as new installation. The force of the springs will be transmitted through the various scraping rings and maintain the outer surface of the left-hand scraping ring in constant contact with the inner surface of the wall 58 of the stuffing box, so that it will always be in readiness to seal the joint against a flow of liquid due to a pressure at the right of the wall plate exceeding that at the left.

The stuffing box may be provided with one or more drainage ports 46' and with a vent 47' adapted to serve the purposes of the ports 46 and vent 47 illustrated in Fig. 6.

Figure 8:
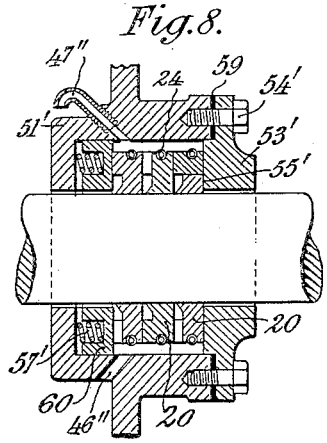
Fig. 8 is a cross-sectional view through a scraping device comprising scraping rings like those illustrated in Fig. 1, mounted in a reconstructed stuffing box and adapted to effect a fluid-tight seal against pressure in a direction opposite to that provided for by the device illustrated in Fig. 7.

In Fig. 8 is illustrated a modified form of reconstructed stuffing box. In this instance a gasket 59 may be secured between the gland 53' and the stuffing box 51' by fastening means 54' in order to effect a fluid-tight seal. The gland may be trimmed off as at 55' to provide space in the stuffing box of greater length than is needed for the housing of the packing and scraping rings 20. In this additional space may be placed a follower ring 60 having openings therein to receive springs 57' by which the ring may be caused to press the scraping rings toward the right and keep the outer surface of the right-hand ring in close contact with the wall 55' of the gland, whereby it will at all times be in readiness to effect a seal against the flow of fluid from the left side of the partition wall to the right side.

The stuffing box illustrated in Fig. 8 may be provided with one or more drainage ports 46" and a vent 47" as indicated.

It will be apparent that Figs. 7 and 8 differ in that one affords a seal against the flow of fluid in one direction and the other effects a seal against the flow of fluid in the opposite direction.

The invention is not intended to be limited to the specific forms of the invention herein disclosed for purposes of illustration, but should be regarded as covering modifications and variations thereof within the scope of the appended claims.

What is claimed is:

1. A segmental, metal, piston rod scraper comprising a contractible ring having resilient contracting means of such strength as to maintain its segments in contact with the surface of a piston rod under pressure sufficient to break down and remove a film of lubricating oil or similarly viscous liquid, said ring having a groove in its inner periphery along a circumferential zone intermediate its two lateral surfaces thus dividing the inner portion of the ring into two annular elements each adapted to have contact with the piston rod, one surface of the groove being so disposed as to meet the inner surface of the ring at an angle such as to produce a scraping edge, and ports leading from said groove to one of the lateral surfaces of the ring through which liquid removed from a piston rod by said surface may be drained away.

2. A scraping ring, as defined by claim 1, having spacing means extending from one of the exterior faces of the ring by which it may be separated from an adjacent surface, and ports in said spacing means to drain away liquid removed from a piston rod, the ports leading from the groove in the ring being so disposed as to communicate with the ports in said spacing means.

3. A scraping ring, as defined by claim 1, comprising imperforate segments having contacting surfaces forming close-fitting joints along their planes of separation, extending inwardly to the inner surfaces of the segments, said ring having a plane surface at one side adapted to cooperate with an opposed wall of a casing or housing to effect a fluid-tight seal.

4. A piston rod scraping device comprising scraping means surrounding the piston rod, a casing enclosing the scraping means, a port in the lower wall of said casing to drain away liquid removed from the piston by the scraping means, and an open port at a higher level in the casing to serve as a vent.

5. A piston rod scraping device comprising a casing having spaced wall portions with aligned openings therein of a diameter sufficient to provide a free working clearance about the piston with which the device is intended for use, scraper rings mounted in said casing with a free working clearance between said wall portions so that they may float with respect thereto with the slight lateral movements of the piston, a port in the lower wall of said casing to drain away liquid removed from the piston rod by the scraper rings, and an open port at a higher level in said wall to serve as a vent.

In witness whereof, I have hereunto signed my name.

EDGAR N. FOX.